(12) United States Patent
Sprenger

(10) Patent No.: US 10,935,774 B2
(45) Date of Patent: Mar. 2, 2021

(54) IMMERSION OBJECTIVE

(71) Applicant: Carl Zeiss Microscopy GmbH, Jena (DE)

(72) Inventor: Jörg Sprenger, Göttingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 254 days.

(21) Appl. No.: 16/156,876

(22) Filed: Oct. 10, 2018

(65) Prior Publication Data

US 2019/0107701 A1    Apr. 11, 2019

(30) Foreign Application Priority Data

Oct. 10, 2017  (DE) .......................... 102017218019.6

(51) Int. Cl.
| | | |
|---|---|---|
| *G02B 21/02* | (2006.01) | |
| *G02B 21/33* | (2006.01) | |
| *G02B 9/64* | (2006.01) | |

(52) U.S. Cl.
CPC ............... *G02B 21/02* (2013.01); *G02B 9/64* (2013.01); *G02B 21/025* (2013.01); *G02B 21/33* (2013.01)

(58) Field of Classification Search
CPC ...... G02B 21/02; G02B 21/025; G02B 21/33; G02B 9/64
See application file for complete search history.

(56) References Cited

U.S. PATENT DOCUMENTS

| | | | | |
|---|---|---|---|---|
| 5,982,559 | A  * | 11/1999 | Furutake | ................ G02B 21/33 |
| | | | | 359/656 |
| 6,674,582 | B2 * | 1/2004 | Kawasaki | ............ G02B 21/025 |
| | | | | 359/380 |
| 8,988,797 | B2 | 3/2015 | Fahlbusch et al. | |
| 9,488,817 | B2 | 11/2016 | Shi et al. | |
| 2010/0182702 | A1 * | 7/2010 | Watanabe | .............. G02B 21/33 |
| | | | | 359/656 |

FOREIGN PATENT DOCUMENTS

| | | |
|---|---|---|
| DE | 10 2011 117 743 A1 | 7/2012 |
| DE | 10 2012 007 359 B3 | 10/2013 |

OTHER PUBLICATIONS

German Search Report for application No. 10 2017 218 019.6, dated Jun. 13, 2018 (7 pgs).

* cited by examiner

*Primary Examiner* — Christopher Stanford

(74) *Attorney, Agent, or Firm* — Fish & Richardson P.C.

(57) ABSTRACT

An immersion objective having a highly refractive single front lens and, immediately adjacent a beam waist, a cemented triplet group with a focal length less than or equal to −1.5 times the focal length of the immersion objective.

20 Claims, 3 Drawing Sheets

10,935,774 B2

IMMERSION OBJECTIVE

RELATED APPLICATION

The present application claims priority to German Application No. 102017218019.6 filed Oct. 10, 2017, which is hereby incorporated herein in its entirety by reference.

TECHNICAL FIELD

The invention relates to an immersion objective, in particular an immersion objective for live cell imaging applications. Furthermore, the invention relates to a microscope having such an immersion objective.

BACKGROUND

High-aperture objectives with a large working distance and a correction function are desirable, in particular for live cell imaging applications (imaging of preparations with living cells). However, the required working distance in conjunction with high apertures can usually only be achieved by increasing the objective installation length.

SUMMARY

It is an object of the invention to improve an immersion objective, in particular an immersion objective for live cell imaging applications. This object is achieved by means of the features of claim 1. The core of the invention consists in embodying an immersion objective with a highly refractive single front lens, followed by one or more single lenses and/or one or more cemented groups, a cemented triplet group, which is arranged immediately upstream of a beam waist, and two to at most four individual and/or cemented lenses.

It was found that a particularly short installation length, in particular a short parfocal length, is achievable using such an objective design.

The design according to the invention leads to an objective with a sufficiently high transmission. The highly refractive front lens has a configuration that is as slim as possible. It preferably has a thickness of at most 5 mm, in particular at most 4.5 mm, in particular at most 4.3 mm, preferably at most 4 mm, in particular at most 3.5 mm, in particular at most 3.3 mm, in particular at most 3.105 mm.

In particular, it can be configured in such a way that it achieves an overall transmittance of more than 80% at a wavelength of 400 nm.

According to the invention, it was recognized that it is advantageous if the absolute value of the front radius of the front lens is greater than a predetermined minimum value. In particular, the front lens has a front radius that is less than −10 mm, in particular less than −13 mm, in particular less than −15 mm, in particular less than −16 mm.

The combination of a cemented triplet group with a negative focal length immediately upstream of the beam waist and two to four individual and/or cemented lenses immediately downstream of the beam waist leads to a large field of view.

According to one aspect of the invention, the front lens of the objective is manufactured from a glass with a refractive index ($n_e$) at a wavelength of 546 nm, for which the following applies: $n_e(L_1) > 1.74$, in particular $n_e(L_1) > 1.8$, in particular $n_e(L_1) > 1.9$, in particular $n_e(L_1) > 2$.

Using the objective according to the invention, it is possible to penetrate deeper into tissue structures or entire organisms. This opens up the option of examining processes and mechanisms in living, still intact structures. Here, the specimens in the refractive index are adapted with special clearing media and freed from scattering centres in order to facilitate a penetration of light into deeper regions. These substances, like the subsequently used immersions, differ to quite an extent in their optical properties, depending on application. A deep optical penetration into a specimen leads to the advantage that it is possible to dispense with the preparation of numerous individual slices. As a result of this, a formation of artefacts as a consequence of mechanical influences is avoided. Moreover, the reconstruction of three-dimensional structures is simplified.

On account of the compact design of the objective according to the invention, the latter can be used with conventional microscope systems.

According to an aspect of the invention, the working distance of the objective is at least 3 mm. Hence, penetration depth of at least 3 mm is facilitated.

The maximum working distance can be in particular at least 4 mm, in particular at least 4.2 mm, in particular at least 4.4 mm, in particular at least 5 mm.

According to a further aspect of the invention, the objective is integrable into a parfocal length of at most 60 mm, in particular in the range of 45 mm to 60 mm.

As a result of this, the accessibility of the specimen is improved. This leads to simpler specimen handling.

Consequently, the objective is usable with a multiplicity of microscope systems.

In accordance with a further aspect of the invention, the objective is embodied as a correction objective.

This renders it possible to meet the requirements of different clearing immersions, or to be able to react to the variation thereof. The correction function of the objective serves, in particular, to compensate refractive index variations on the path from the object to the objective.

A characteristic of a correction objective is that at least one of the optical components, in particular a plurality of the optical components, of same is displaceable. For details, reference is made in representative fashion to DE 10 2011 117 743 A1.

In the listed objective configurations, care was taken here for the constructional realizability to be as simple as possible, this consisting in exemplary embodiment 3 in a pure displacement of a single lens, which is situated between the otherwise stationary front and rear groups. The movement requirement minimized in the process is found to be very advantageous in respect of the unavoidable mechanical tolerances, both for a manual and for a motor-driven actuation.

In particular, the lenses number no more than 6 between the front lens and the cemented triplet group immediately upstream of the beam waist. In particular, they can number 5 or 6.

According to further aspect of the invention, the numerical aperture of the objective is at least 0.8. The numerical aperture can be in particular at least 0.95, in particular at least 1, in particular at least 1.05. This leads to a high resolution.

According to a further aspect of the invention, the objective has, at most, a 32×-magnification. In particular, the magnification of the objective lies in the range between 16× and 32×. In particular, it can be 16×, 20×, 25× or 32×. Values deviating therefrom are also possible. Such magnifications are also referred to as low-power magnifications. Consequently, the objective is, in particular, a low-power objective.

According to a further aspect of the invention, the objective has an object field with a diameter of at least 0.7 mm, in particular of at least 0.8 mm, in particular of at least 0.9 mm and in particular of at least 1 mm. This is particularly expedient for a low-power objective.

According to a further aspect of the invention, the following applies to a ratio between the focal length $f'_{Obj}$ of the objective and its installation length $l_{Obj}$: $0.11 < f'_{Obj}/l_{Obj} * NA < 0.19$. This was found to be a particularly expedient division between the objective installation length $l_{Obj}$ and the objective focal length $f'_{Obj}$.

According to further aspect of the invention, the objective is constructed from a highly refractive front lens, followed by a central objective part, as a result of which a very strong beam deflection can be achieved. This is cancelled by the negative groups disposed upstream and downstream of the beam waist and collimated in the rear objective part. Firstly, this arrangement renders it possible to realize the required large working distances; secondly, the use and the positioning of the negative groups brings about a reduction in the Petzval curvature and hence very good image field flattening. In this central objective part, use is made of positive lenses made of fluorite and, e.g., fluor- and phosphate-crown glasses. These can be combined with at least one short-flint-type negative lens in cemented doublet, triplet or quadruplet members.

As a result of the negative group upstream of the beam waist, in particular as a result of the use of a negative lens made of a material with a high dispersion and refractive index in the negative cemented triplet group, the convergence caused by the strong beam deflection of the front lens and the central group can be cancelled.

A subsequent collimation can be achieved by using materials with a higher dispersion and refractive index in converging lenses after the waist.

The rather undesirable flint character of the negative lens can be compensated very well by the arrangement in a triplet group, and so even an apochromatic correction is possible up into the near IR range.

According to a further aspect of the invention, the cemented triplet group has a focal length $f'_{G3}$, for which the following applies: $f'_{G3} \leq -15$ mm, in particular $f'_{G3} \leq -16$ mm, in particular $f'_{G3} \leq -30$ mm.

According to a further aspect of the invention, the objective comprises at least two single lenses, a cemented doublet or triplet group or a cemented group in combination with a single lens downstream or in the beam waist in addition to the cemented triplet group which is disposed immediately upstream of the beam waist.

According to an aspect of the invention, a group of lenses comprising a cemented group and two single lenses is arranged between the front lens of the objective and the cemented triplet group immediately upstream of the beam waist. In particular, the cemented group is enclosed by the two single lenses. The front single lens can have a biconvex or concave-convex embodiment. The back single lens preferably has a biconvex embodiment. The cemented group can be embodied as a cemented triplet group with a biconvex lens enclosed by two meniscus lenses. The back meniscus lens can also be replaced by a combination of a biconcave and a biconvex lens. In this case, the cemented group is embodied as a cemented quadruplet group.

According to a further aspect of the invention, the cemented triplet group, which is disposed immediately upstream of the beam waist, and the downstream lenses, which together are also referred to as image-side group, are arranged in stationary fashion in relation to one another.

According to an alternative, the cemented triplet group immediately upstream of the beam waist and the image-side group are displaceable relative to one another.

This can contribute to the compensation of refractive index variations on the path from the object to the objective.

A further object of the invention is to improve a microscope. This object is achieved by means of a microscope with an immersion objective according to the description above.

The advantages are evident from those of the immersion objective.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Further features and advantages of the invention will become apparent from the description of exemplary embodiments with reference to the figures. In the figures.

Figure 1:
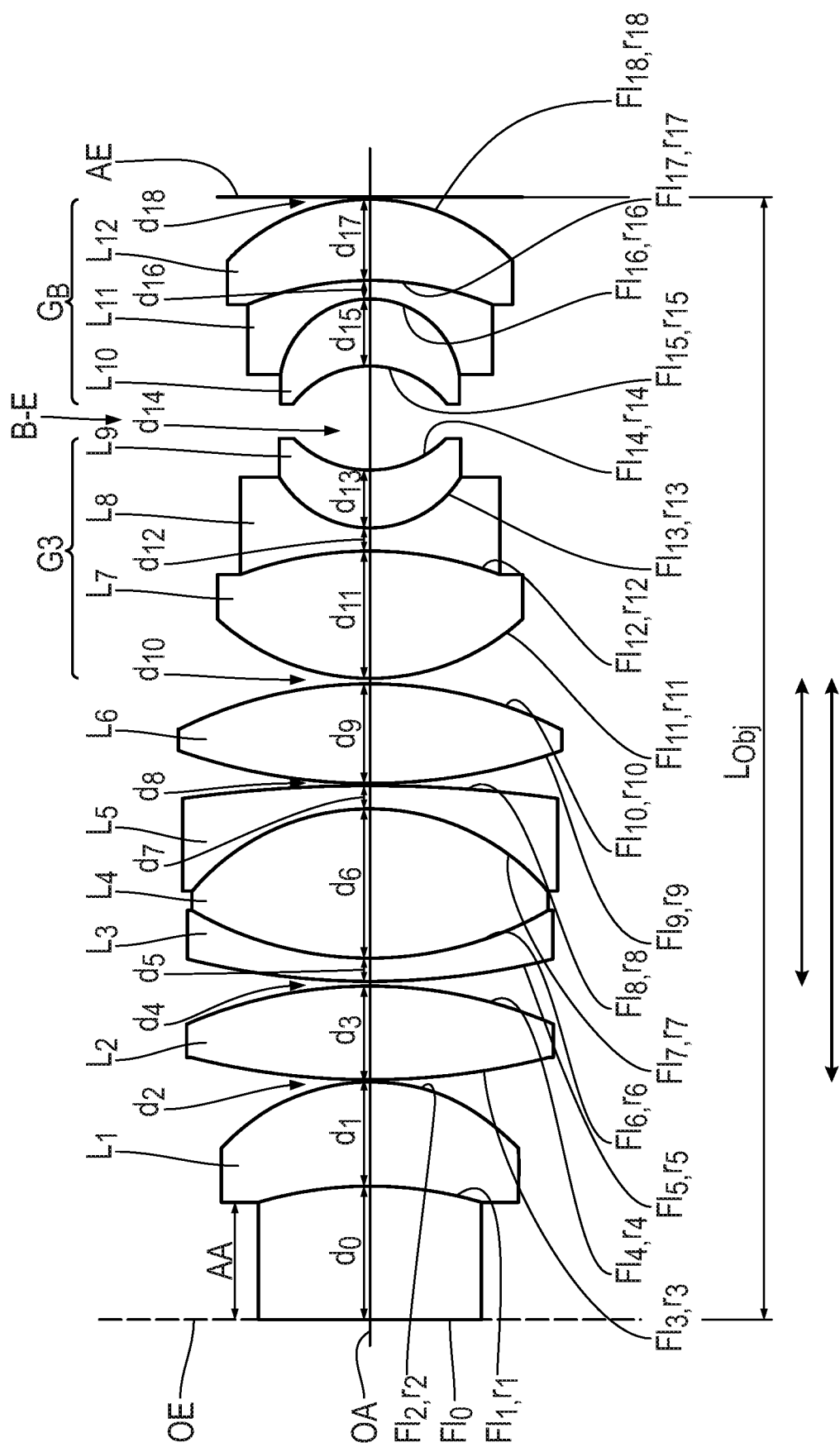
FIG. 1 schematically shows a sectional illustration of the arrangement of the lenses of an immersion objective according to a first alternative.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Below, different alternatives of designs of an immersion objective are described in exemplary fashion.

FIG. 1 shows a longitudinal section through the optical elements of an immersion objective, proceeding from an object plane OE.

The immersion objective has a single front lens $L_1$. The front lens $L_1$ has a front radius $r1(L_1)$ of $-16.524$ mm. In general, the absolute value of the front radius $r1(L_1)$ of the front lens $L_1$ is greater than $$\sqrt{33 + (AA/\text{mm})^3 (NA + 0.16)^6},$$

where AA specifies the maximum obtainable working distance of the objective and NA denotes the numerical aperture of the objective.

The front lens $L_1$ is made of a highly refractive material. In particular, it is made of a material with a refractive index $n_e$ of 2.0117 at a wavelength of 546 nm. In general, the front lens $L_1$ is made of a material with a refractive index $n_e(L_1)$ of more than 1.74.

The front lens $L_1$ is embodied as a meniscus lens that is bent toward the object plane OE. In particular, this should be understood to mean that the concave side ($Fl_1$) of the lens $L_1$ points to the object plane OE. The convex side ($Fl_2$) points away from the object plane OE.

The front lens $L_1$ is followed by a group of five lenses $L_2$ to $L_6$. Here, this is a cemented triplet group comprising the lenses $L_3$, $L_4$ and $L_5$, which is enclosed by two biconvex lenses $L_2$ and $L_6$.

In particular, provision is made for the lenses $L_1$ and $L_2$ to be respectively arranged in displaceable fashion. Moreover, the two cemented triplet groups $L_7$ to $L_9$ and $L_{10}$ to $L_{12}$ are displaceable together relative to the remaining lenses of the objective. The detailed design data of the optical design of the objective according to FIG. 1 are listed in Table 1. As may be gathered from the table, the lenses are displaceable relative to one another for the purposes of adapting the objective to different immersion media. In the process, certain lens groups remain arranged in stationary fashion in relation to one another.

|  | Surface Fl | Radius of curvature r [mm] | Thickness or spacing d [mm] | | | Refractive index $n_e$ | Abbe number $v_e$ |
|---|---|---|---|---|---|---|---|
|  |  |  | Immersion nIm = 1.4507 | Immersion nIm = 1.4337 | Immersion nIm = 1.4167 |  |  |
|  | 0 |  | 5.763 | 5.711 | 5.659 | nIm | 40.7 |
| $L_1$ | 1 | −16.524 |  | 4.500 |  | 2.0117 | 28.1 |
|  | 2 | −8.4202 | 0.100 | 0.161 | 0.226 |  |  |
| $L_2$ | 3 | 30.6624 |  | 4.044 |  | 1.4572 | 90.5 |
|  | 4 | −19.3463 | 0.209 | 0.291 | 0.346 |  |  |
| $L_3$ | 5 | 32.0013 |  | 1.000 |  | 1.6539 | 55.6 |
| $L_4$ | 6 | 14.974 |  | 6.448 |  | 1.4350 | 94.8 |
| $L_5$ | 7 | −9.8344 |  | 1.000 |  | 1.6166 | 44.3 |
|  | 8 | −57.9314 |  | 0.100 |  |  |  |
| $L_6$ | 9 | 24.1313 |  | 4.300 |  | 1.4399 | 94.5 |
|  | 10 | −17.8084 | 0.238 | 0.169 | 0.100 |  |  |
| $L_7$ | 11 | 9.5052 |  | 5.500 |  | 1.5945 | 68.0 |
| $L_8$ | 12 | −15.481 |  | 1.000 |  | 1.7617 | 27.4 |
| $L_9$ | 13 | 4.5005 |  | 2.500 |  | 1.6969 | 56.0 |
| B-E | 14 | 4.5465 |  | 4.492 |  |  |  |
| $L_{10}$ | 15 | −4.100 |  | 2.900 |  | 1.5395 | 74.3 |
| $L_{11}$ | 16 | −3.8536 |  | 0.800 |  | 1.5848 | 40.6 |
| $L_{12}$ | 17 | −13.582 |  | 3.500 |  | 1.9105 | 31.1 |
|  | 18 | −8.2688 |  | 0.100 |  |  |  |

The cemented triplet group comprises a biconvex lens $L_4$, which is enclosed by two lenses $L_3$, $L_5$, which are each embodied as a meniscus lens.

This is followed by two cemented triplet groups comprising the lenses $L_7$, $L_8$ and $L_9$, and $L_{10}$, $L_{11}$ and $L_{12}$, respectively. The cemented triplet group with the lenses $L_7$, $L_8$ and $L_9$ is denoted by G3 in the figure. It has a focal length $f'_{G3}$ of −16.0 mm. The cemented triplet group G3 is disposed immediately upstream of a beam waist, which is denoted by B-E in the figure.

The cemented triplet group G3 comprises the lens $L_8$ embodied in biconcave fashion, which is arranged between the lens $L_7$ embodied in biconvex fashion and the lens $L_9$ embodied as a meniscus lens.

The lenses $L_{10}$, $L_{11}$ and $L_{12}$ are each embodied as a concave-convex meniscus lens.

The lenses $L_{10}$, $L_{11}$, $L_{12}$, which are disposed on the image side with respect to the beam waist B-E, are also referred to together as image-side group $G_B$.

In order to obtain a correction function for compensating refractive index variations on the path from the object to the objective, the lenses $L_1$ to $L_{12}$ are displaceable relative to one another. In particular, they are displaceable relative to one another in linear fashion in the direction of the optical axis OA. Here, in particular, the distances d0, d2, d4 and d10 are modifiable.

In FIG. 1, the displaceability of the lenses or the lens groups is indicated by double-headed arrows below the respective components.

Moreover, FIG. 1 indicates the position of the objective end AE. The screw-in surface of the objective can lie offset further to the left, i.e., towards the object plane OE, in the figures. In particular, it can be offset from the objective end AE by approximately 3 mm.

The objective has an overall installation length $L_{Obj}$ of less than 60 mm.

The objective has a numerical aperture of 0.95.

The objective has a maximum working distance AA of 5.0 mm.

FIG. 1 does not illustrate the purely mechanical constituent parts of the objective and the manual or motor-driven adjustment devices that are used for displacing the lenses and lens groups.

An alternative of the optical design of the objective is described below with reference to FIG. 2.

Some design features correspond to those of the alternative according to FIG. 1, the description of which is referred to hereby.

The focal length $f'_{G3}$ of the cemented triplet group G3 is −31.7 mm.

Figure 2:
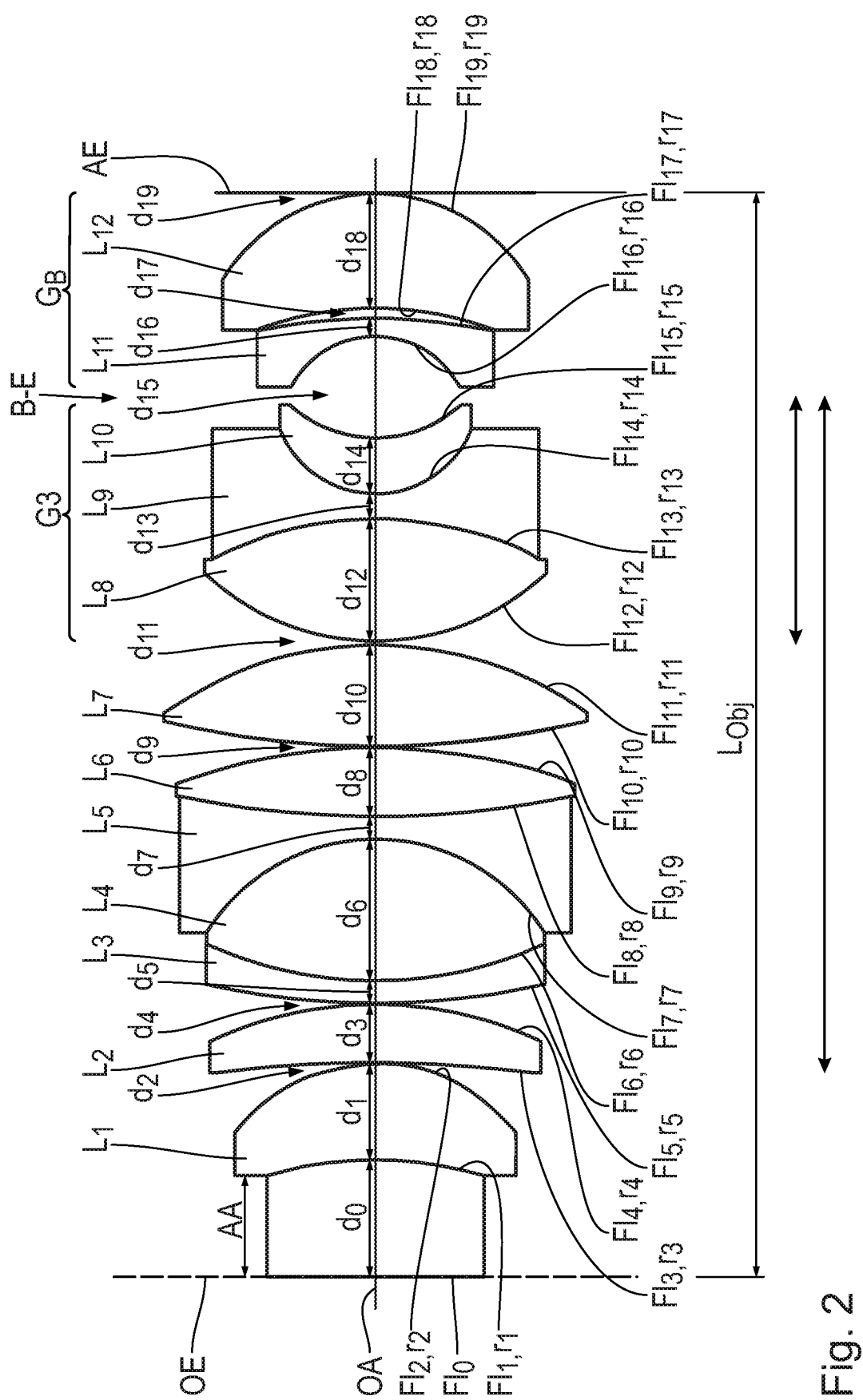
FIG. 2 schematically shows a sectional illustration of the arrangement of the lenses of an immersion objective according to a second alternative.

In particular, a cemented triplet group G3 is also disposed immediately upstream of the beam waist B-E in the design according to FIG. 2.

However, downstream thereof, provision is made of an image-side group $G_B$ with two single lenses $L_{11}$ and $L_{12}$.

In this alternative, the cemented triplet group G3 and the image-side group $G_B$ are displaced relative to one another for the purposes of compensating refractive index variations.

The front lens $L_1$ is likewise embodied as a meniscus lens that is bent toward the object plane OE.

The group of the lenses $L_2$ to $L_7$ between the front lens $L_1$ and the cemented triplet group G3 comprises two single lenses $L_2$ and $L_7$, and a cemented quadruplet member comprising the lenses $L_3$ to $L_6$.

The objective has a numerical aperture NA of 1.0.

The objective according to FIG. 2 has a maximum working distance AA of 4.4 mm.

The detailed design data of the alternative according to FIG. 2 are summarized in Table 2.

| | Surface Fl | Radius of curvature r [mm] | Thickness or spacing d [mm] Immersion nIm = 1.383 | Thickness or spacing d [mm] Immersion nIm = 1.406 | Refractive index $n_e$ | Abbe number $v_e$ |
|---|---|---|---|---|---|---|
| | 0 | | 5.171 | 5.245 | nIm | 51.6 |
| $L_1$ | 1 | −16.00 | 4.300 | | 2.0117 | 28.1 |
| | 2 | −7.695 | 0.199 | 0.050 | | |
| $L_2$ | 3 | −52.2272 | 2.600 | | 1.6969 | 56.0 |
| | 4 | −16.723 | 0.050 | | | |
| $L_3$ | 5 | 33.4156 | 1.000 | | 1.6413 | 42.2 |
| $L_4$ | 6 | 17.455 | 6.345 | | 1.4350 | 94.8 |
| $L_5$ | 7 | −8.6591 | 1.000 | | 1.6166 | 44.3 |
| $L_6$ | 8 | 40.9197 | 3.103 | | 1.4399 | 94.5 |
| | 9 | −24.413 | 0.050 | | | |
| $L_7$ | 10 | 38.8374 | 4.553 | | 1.4399 | 94.5 |
| | 11 | −15.6458 | 0.050 | 0.154 | | |
| $L_8$ | 12 | 10.7763 | 5.500 | | 1.6969 | 56.0 |
| $L_9$ | 13 | −14.9297 | 1.100 | | 1.7231 | 29.3 |
| $L_{10}$ | 14 | 4.501 | 2.500 | | 1.5945 | 68.0 |
| B-E | 15 | 5.5445 | 4.544 | 4.562 | | |
| $L_{11}$ | 16 | −4.1558 | 0.800 | | 1.7434 | 32.0 |
| | 17 | −24.0297 | 0.455 | | | |

-continued

| | Surface Fl | Radius of curvature r [mm] | Thickness or spacing d [mm] Immersion nIm = 1.383 | Thickness or spacing d [mm] Immersion nIm = 1.406 | Refractive index $n_e$ | Abbe number $v_e$ |
|---|---|---|---|---|---|---|
| $L_{12}$ | 18 | −14.4551 | 5.121 | | 1.9234 | 31.4 |
| | 19 | −7.7674 | 0.050 | | | |

A further alternative of the design of the objective is described below with reference to FIG. 3. The substantially qualitative design features once again correspond to those of the design according to FIG. 1, the description of which is referred to hereby.

Figure 3:
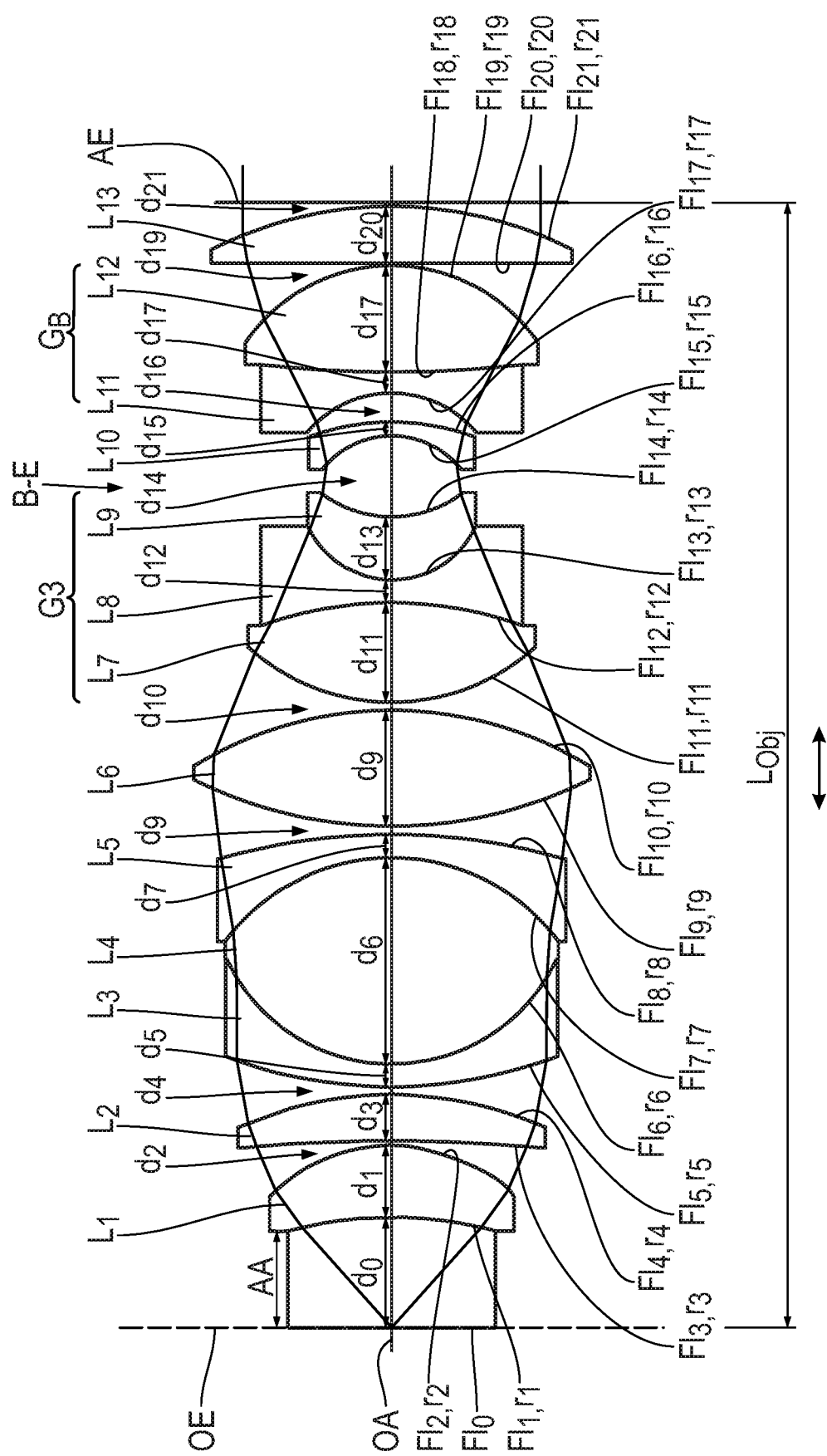
FIG. 3 schematically shows a sectional illustration of the arrangement of the lenses of an immersion objective according to a third alternative, wherein the beam path for an axis point is illustrated in an exemplary fashion.

In the objective design according to FIG. 3, four lenses $L_{10}$, $L_{11}$, $L_{12}$ and $L_{13}$ are disposed downstream of the beam waist B-E. The lenses $L_{11}$ and $L_{12}$ form a cemented doublet group.

The lens $L_{13}$ is a planoconvex lens.

The design according to FIG. 3 is distinguished by a particularly simple correction function. According to this design, it is sufficient to displace the single lens $L_6$ in the direction of the optical axis OA. All remaining lenses $L_i$, i≠6 can be arranged in the objective in stationary fashion.

The objective with the design according to FIG. 3 has a numerical aperture of 1.05.

The objective according to FIG. 3 has a maximum working distance AA of 4.2 mm.

The focal length $f'_{G3}$ of the cemented triplet group G3 immediately upstream of the waist is −15.0 mm.

The detailed design data of the alternative according to FIG. 3 are summarized in Table 3.

| | Surface Fl | Radius of curvature r [mm] | Thickness or spacing d [mm] Immersion nIm = 1.3833 vIm = 51.6 | Thickness or spacing d [mm] Immersion nIm = 1.4218 vIm = 55.2 | Thickness or spacing d [mm] Immersion nIm = 1.4556 vIm = 59.4 | Refractive index $n_e$ | Abbe number $v_e$ |
|---|---|---|---|---|---|---|---|
| | 0 | | 4.6888 | 4.7636 | 4.8285 | nIm | vIm |
| $L_1$ | 1 | −16.6684 | | 3.105 | | 2.0304 | 28.8 |
| | 2 | −7.182 | | 0.196 | | | |
| $L_2$ | 3 | −64.4751 | | 2.000 | | 1.6969 | 56.0 |
| | 4 | −15.732 | | 0.298 | | | |
| $L_3$ | 5 | 19.387 | | 1.000 | | 1.5035 | 56.2 |
| $L_4$ | 6 | 7.717 | | 8.900 | | 1.4350 | 94.8 |
| $L_5$ | 7 | −8.7856 | | 1.000 | | 1.6166 | 44.3 |
| | 8 | −26.4125 | 0.5679 | 0.3529 | 0.1694 | | |
| $L_6$ | 9 | 18.700 | | 5.000 | | 1.4572 | 90.5 |
| | 10 | −15.9619 | 0.1266 | 0.3417 | 0.5251 | | |
| $L_7$ | 11 | 9.039 | | 4.300 | | 1.5945 | 68.0 |
| $L_8$ | 12 | −16.0782 | | 0.980 | | 1.7617 | 27.4 |
| $L_9$ | 13 | 3.9243 | | 2.715 | | 1.5973 | 67.4 |
| | 14 | 4.940 | | 3.493 | | | |
| $L_{10}$ | 15 | −3.760 | | 0.600 | | 1.6413 | 42.2 |
| | 16 | −9.999 | | 1.250 | | | |
| $L_{11}$ | 17 | −4.665 | | 0.900 | | 1.6166 | 44.3 |
| $L_{12}$ | 18 | 48.3474 | | 4.596 | | 1.5945 | 68.0 |
| | 19 | −7.4996 | | 0.100 | | | |
| $L_{13}$ | 20 | U | | 2.450 | | 1.6522 | 33.6 |
| | 21 | −16.7875 | | 0.159 | | | |

A microscope has a tube system for imaging the intermediate image produced by means of the objective according to any one of the alternatives described above. The design data of the tube system are summarized in Table 4.

| Surface Fl | Radius of curvature r [mm] | Thickness or spacing d [mm] | Refractive index $n_e$ | Abbe number $v_e$ |
|---|---|---|---|---|
| 1 | | 126.5 | | |
| 2 | 189.417 | 10.9 | 1.5821 | 53.6 |
| 3 | −189.417 | 60.0 | | |
| 4 | Plane | 80.0 | 1.5187 | 64.0 |
| 5 | Plane | 48.2 | | |

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An immersion objective with a focal length, a numerical aperture (NA) and a maximum achievable working distance (AA), which, proceeding from an object plane, comprises a front group which comprises:
a single lens ($L_1$), wherein the single lens comprises glass with a refractive index at a wavelength of 546 nm, wherein the refractive index is greater than or equal to 1.74;
one or more single lenses and/or one or more cemented groups;
a cemented triplet group having a focal length that is less than −1.5 times the focal length of the immersion objective as a whole; and
an image-side group comprising two to four lenses, wherein:
the immersion objective has a beam waist; and
along an optical axis of the immersion objective:
the immersion objective does not include any lenses between the cemented triplet group and the beam waist; and
the immersion objective does not include any lenses between the object plane and the single lens ($L_1$).

2. The immersion objective according to claim 1, wherein the single lens ($L_1$) has a front radius ($r_1$), for which:

$$|r_1(L_1)| > \sqrt{33 + (AA/\text{mm})^3 (NA + 0.16)^6}.$$

3. The immersion objective according to claim 1, wherein the maximum achievable working distance (AA) is at least 3 mm.

4. The immersion objective according to claim 1, wherein a parfocal length is less than or equal to 60 mm.

5. The immersion objective according to claim 1, wherein the immersion objective is embodied as a correction objective.

6. The immersion objective according to claim 5, wherein only one individual single lens is displaceable.

7. The immersion objective according to claim 1, wherein the numerical aperture (NA) is at least 0.8.

8. The immersion objective according to claim 1, wherein the overall immersion objective has, at most, a 32×-magnification.

9. The immersion objective according to claim 1, wherein the overall immersion objective has an object field with a diameter of at least 0.7 mm.

10. The immersion objective according to claim 1, wherein a ratio calculated by dividing the overall focal length of the immersion objective by an installation length of the immersion objective is from 0.11 to 0.19.

11. The immersion objective according to claim 1, wherein a front radius of curvature of the single lens ($L_1$) is at most −15 mm.

12. The immersion objective according to claim 1, wherein the immersion objection comprises a total of at most 13 lenses.

13. The immersion objective according to claim 1, further comprising a second cemented triplet group or a cemented quadruplet group between the first cemented triplet group and the single lens ($L_1$).

14. The immersion objective according to claim 1, wherein the cemented triplet group has a focal length less than or equal to −15 mm.

15. A microscope including an immersion objective, the immersion objective having a focal length, a numerical aperture (NA) and a maximum achievable working distance (AA), and, proceeding from an object plane, comprises a front group including: which comprises:

a single lens, wherein the single lens comprises glass with a refractive index at a wavelength of 546 nm, and wherein the refractive index is greater than or equal to 1.74;

one or more single lenses and/or one or more cemented groups;

a cemented triplet group having a focal length that is less than or equal to −1.5 times the focal length of the immersion objective as a whole; and an image-side group comprising two to four lenses, wherein:
    the immersion objective has a beam waist; and
    along an optical axis of the immersion objective:
        the immersion objective does not include any lenses between the cemented triplet group and the beam waist; and
        the immersion objective does not include any lenses between the object plane and the single lens ($L_1$).

16. The microscope according to claim 15, wherein the single lens ($L_1$) has a front radius ($r_1$), for which:

$$|r_1(L_1)| > \sqrt{33 + (AA/\text{mm})^3 (NA + 0.16)^6}.$$

17. The microscope according to claim 15, wherein the maximum achievable working distance (AA) is at least 3 mm.

18. The microscope according to claim 15, wherein a parfocal length is less than or equal to 60 mm.

19. The microscope according to claim 15, wherein the numerical aperture (NA) is at least 0.8.

20. The microscope according to claim 15, wherein the overall immersion objective has an object field with a diameter of at least 0.7 mm.

* * * * *

UNITED STATES PATENT AND TRADEMARK OFFICE
CERTIFICATE OF CORRECTION

PATENT NO. : 10,935,774 B2  
APPLICATION NO. : 16/156876  
DATED : March 2, 2021  
INVENTOR(S) : Joerg Sprenger Page 1 of 1

It is certified that error appears in the above-identified patent and that said Letters Patent is hereby corrected as shown below:

In the Claims

Column 10, Line 67, Claim 15, delete "group including:" and insert -- group --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*